United States Patent Office 3,247,065
Patented Apr. 19, 1966

3,247,065
FREE-FLOWING COATED ASCORBIC ACID
Arnold Koff, West Orange, N.J., assignor to Hoffman-La Roche Inc., Nutley, N.J., a corporation of New Jersey
No Drawing. Filed Oct. 14, 1963, Ser. No. 316,171
4 Claims. (Cl. 167—81)

The present invention relates to a new article of manufacture and to the procedure for preparing same. More particularly, the invention relates to a new and improved stable vitamin C product in the form of a free-flowing powder which is characterized by the lack of the unpleasant taste normally associated with ascorbic acid.

Ascorbic acid (vitamin C) is a valuable component of multi-vitamin preparations. Furthermore, its utilization as a food additive is well established. In the past, ascorbic acid, when treated by conventional procedures in order to enable it to be utilized for such purposes, has evidenced the propensity to turn brown and discolor, indicating degradation after only a short period of storage, particularly in the presence of other substances which have shown themselves to be incompatible with ascorbic acid such as iron. Furthermore, ascorbic acid inherently suffers from the defect of having an unpleasant taste. Thus, in order to render ascorbic acid suitable for use as, for example, a food additive, it is essential that it be placed in a form which is stable and which is free from the defect of the unpleasant taste normally associated with vitamin C.

Thus, it is the object of the present invention to provide an ascorbic acid preparation which is stable after long periods of storage, even when mixed with a material which is incompatible with ascorbic acid and which is acceptable insofar as taste considerations are concerned.

In achieving these objectives within the purview of the present invention, it has been found that the combination of ethyl cellulose, hydrogenated castor oil and ascorbic acid will result in a free-flowing ascorbic acid-containing powder which is both highly stable, even in the presence of a material such as iron, and palatable.

More particularly, the invention relates to a composition comprising from about 60 to about 20 percent by weight of ascorbic acid and from about 40 percent to about 80 percent by weight of a mixture comprising ethyl cellulose and hydrogenated castor oil in the ratio of from about .5 to about 20 parts by weight of ethyl cellulose to from about 99.5 to about 80 parts by weight of hydrogenated castor oil. Advantageously, the composition will comprise, on a weight basis, for about every 1 part of ascorbic acid, from about 1 to about 3 parts of a mixture comprising ethyl cellulose and hydrogenated castor oil in the ratio of from about 3 to about 10 parts of ethyl cellulose to about 97 to about 90 parts of hydrogenated castor oil. Preferably, the mixture consists essentially of ethyl cellulose and hydrogenated castor oil.

Hydrogenated castor oil is known commercially under various trade names such as "Castorwax." Hydrogenated castor oil is a synthetic wax-like compound obtained by the controlled hydrogenation of castor oil. The principal constituent is the glyceride of 12-hydroxystearic acid. There are also present minor quantities of mixed glycerides of this acid and dihydroxystearic and stearic acids. Hydrogenated castor oil is a hard, brittle product having a high melting point. It is characterized in that it is practically odorless and tasteless. It is furnished in the form of uniform free-flowing flakes. It has low acid and iodine numbers, a high saponification number and a melting point of about 86° C.

Any ethyl cellulose which is conveniently available is suitable for the purposes of the present invention. In general, those ethyl celluloses which have an ethoxyl content of between 43 percent and 50 percent or a substitution value between 2.15 and 2.60 ethoxyl groups per anhydroglucose unit and a viscosity between 6 cps. and 250 cps. are preferred. Advantageously, an N-type ethyl cellulose manufactured by the Hercules Powder Company is employed. Such an N-type ethyl cellulose has an ethoxyl content of between 47.5 to 49 percent or a substitution value of between 2.42 to 2.53 ethoxyl groups per anhydroglucose unit and a viscosity between 7 and 200 cps. However, this is not the absolute limit of usefulness, as other ethyl celluloses can be used.

A typical example of a commercial ethyl cellulose suitable for the purposes of the present invention is sold by the Hercules Powder Company under the designation "N–50" and has an ethoxyl content of 47.5 to 49 percent or a substitution value of between 2.42 and 2.53 ethoxyl groups per anhydroglucose unit and a viscosity of 50 cps. This product will be referred to in the examples as ethyl cellulose A.

Another example of a typical commercial ethyl cellulose suitable for the purposes of the present invention is one having an ethoxyl content of 47 percent which softens at 140° and is soluble in ethyl acetate, ethylene dichloride, benzene, toluene, xylene, butyl acetate, acetone, lower alkanols and carbon tetrachloride. This product will be refered to in the examples as ethyl cellulose B.

A preferred process for forming the composition of the present invention involves, as the first step, forming a melt of a hydrogenated castor oil such as Castorwax and uniformly dispersing ethyl cellulose therein. To the resultant dispersion is added ascorbic acid in fine powder form with agitation to insure uniform dispersion of the ascorbic acid. Conveniently, the first step is effected in a melting tank in which the temperature is raised to about 90 to 120° C., thereby heating the hydrogenated castor oil to a temperature several degrees (e.g. 5° C.) above its melting point. The ethyl cellulose and, thereafter, the finely divided ascorbic acid is then dispersed therein with good agitation to produce homogeneous distribution, the temperature of the melting tank being kept sufficiently high to maintain the ethyl cellulose-hydrogenated castor oil-ascorbic acid mixture in a fluid state. The melt is then transferred to a conventional spray-chilling tower or chamber wherein the molten mixture is atomized into droplets which are then quickly chilled by blowing cool air (about 20° C.) through the tower. Any convenient atomizing device (such as a two-fluid nozzle or a high-speed centrifugal atomizing wheel) can be employed under conditions that will give discreet droplets of the melt. The solid or congealed droplets fall to the bottom of the tower where they are collected and then screened in order to remove agglomerates or coarse material.

The melt formed from adding ethyl cellulose to the hydrogenated castor oil can be cooled and stored for future mixing with ascorbic acid. It is preferred however to add the ascorbic acid to the last-mentioned melt, as described above, and then proceed to the finished product. Especially good results are achieved employing the process hereinafter described since the process results in a free-flowing powder containing ascorbic acid coated with the said mixture of ethyl cellulose and hydrogenated castor oil.

Among other advantages in proceeding accordingly is the provision of a free-flowing powder having a high concentration of ascorbic acid which will remain white for long periods and which is lacking in the unpleasant taste normally associated with ascorbic acid.

While this invention has been described with respect to certain embodiments, it is to be understood that such embodiments are merely illustrative of the present invention and not limitative thereof. In the examples, the hydrogenated castor oil used is the commercial product Castorwax referred to hereinabove. All temperatures stated are in degrees centigrade.

*Example 1*

760 g. of hydrogenated castor oil are charged to a melting vessel and heated, while stirring, to a temperature of 110°. 40 g. of ethyl cellulose A, identified above, is mixed into the vessel with stirring, the temperature of the melt meanwhile being gradually raised to 115°. To the resulting melt is added 400 g. of finely divided ascorbic acid, with stirring, for 30 minutes while maintaining the temperature at 115° to assure uniform dispersal. The melt, at the latter temperature, is then transferred to a centrifugal atomizer wheel rotating at 12,000 r.p.m., the molten material being fed at the rate of 25 gallons per hour. Air, at a temperature of 20°, is blown through the spray tower. The chilled droplets fall to the bottom of the tower. Any of the droplets that are carried over in the effluent air stream are collected in a cyclone separator. The powder at the bottom of the tower and in the cyclone separator are collected and screened through a 25 mesh screen. The resulting product is in the form of a white, free-flowing, palatable powder and comprises ascorbic acid coated with a mixture comprising ethyl cellulose and hydrogenated castor oil.

*Example 2*

750 g. of hydrogenated castor oil are charged to a melting vessel and heated therein, while stirring, to a temperature of 105°. To the vessel is then added 50 g. of ethyl cellulose A with stirring, the temperature of the melt meanwhile being gradually raised to 110°. 400 g. of finely divided ascorbic acid is then mixed into the vessel with agitation for 30 minutes while maintaining the temperature at 110° to assure uniform dispersal. The melt, at the latter temperature, is then transferred to a centrifugal atomizer wheel rotating at 12,500 r.p.m., the molten material being fed at the rate of 25 gallons per hour. Air at a temperature of 20° is blown through the spray tower. The chilled droplets fall to the bottom of the tower. Any droplet that is carried over in the effluent air stream is collected in a cyclone separator. All of the resulting powder is collected and screened through a 25 mesh screen. The resulting product is in the form of a white, free-flowing, pleasant tasting powder and comprises ascorbic acid coated with a mixture comprising ethyl cellulose and hydrogenated castor oil.

*Example 3*

760 g. of hydrogenated castor oil are charged to a melting vessel and are heated, while stirring, to a temperature of 103°. 40 g. of ethyl cellulose B, identified above, is mixed into the vessel with stirring, the temperature of the melt meanwhile being gradually raised to 110°. To the resulting melt is added 280 g. of finely divided ascorbic acid with stirring for 30 minutes while maintaining the temperature at 110° to assure uniform dispersal. The melt, at the latter temperature, is then transferred to a centrifugal atomizing wheel rotating at 12,500 r.p.m., the molten material being fed at the rate of 25 gallons per hour. Air at a temperature of 20° C. is blown through the spray tower. The chilled droplets fall to the bottom of the tower. Any droplets that are carried over in the effluent air stream are collected in a cyclone separator. The resultant powder is collected and screened through a 25 mesh screen. The product is an ascorbic acid composition in the form of a white, free-flowing, pleasant tasting stable powder.

I claim:

1. A composition comprising from about 60 to about 20 percent by weight of ascorbic acid and from about 40 to about 80 percent by weight of a mixture comprising ethyl cellulose and hydrogenated castor oil in the ratio of from about .5 to about 20 parts by weight of ethyl cellulose to from about 99.5 parts to about 80 parts by weight of hydrogenated castor oil.

2. A process for forming a composition according to claim 1 which comprises forming a melt containing ethyl cellulose and hydrogenated castor oil, adding to the so-formed melt ascorbic acid, atomizing the resultant melt into discreet liquid droplets, rapidly air cooling said droplets into a congealed state whereby a free-flowing white powder results.

3. A composition comprising ascorbic acid and a mixture containing ethyl cellulose and hydrogenated castor oil, said composition containing for every 1 part by weight of ascorbic acid, from about 1 to about 3 parts by weight of said mixture, said mixture containing the said ethyl cellulose and the said hydrogenated castor oil in the weight ratio of from about .5 to about 20 parts of the former to from about 99.5 to about 80 parts of the latter.

4. A composition as defined in claim 3 wherein the ethyl cellulose and the hydrogenated castor oil are present in the mixture in the ratio of from about 3 to about 10 parts of ethyl cellulose to from about 97 parts to about 90 parts of hydrogenated castor oil.

References Cited by the Examiner

UNITED STATES PATENTS

| | | | |
|---|---|---|---|
| 2,897,119 | 7/1959 | Dunn | 167—81 |
| 2,921,883 | 1/1960 | Reese et al. | 167—82.9 |
| 2,956,926 | 10/1960 | Greif | 167—81 |
| 2,980,589 | 4/1961 | De Grunigen | 167—81 |
| 3,124,510 | 3/1964 | Rosenberg | 167—81 |

LEWIS GOTTS, *Primary Examiner.*

FRANK CACCIAPAGLIA, Jr, *Examiner.*

RICHARD L. HUFF, *Assistant Examiner.*